UNITED STATES PATENT OFFICE.

CARL VON FORELL, OF BRUNSWICK, GERMANY.

ARTIFICIAL PORTLAND CEMENT.

SPECIFICATION forming part of Letters Patent No. 486,706, dated November 22, 1892.

Application filed September 29, 1890. Serial No. 366,566. (No specimens.)

*To all whom it may concern:*

Be it known that I, CARL VON FORELL, director, subject of the King of Prussia, residing at Brunswick, in the Grand Duchy of Brunswick and German Empire, have invented certain new and useful Improvements in Artificial Portland Cement; and I do hereby declare the following to be a full, clear, and exact description of the invention, such as will enable others skilled in the art to which it appertains to make and use the same.

This invention relates to artificial Portland cement; and it consists in the novel composition of ingredients mixed together in the proportions hereinafter fully described and claimed.

Roman cement has been defined at the international meeting of cement-makers as a product obtained by heating aluminous chalky marl below the temperature of fritting until the carbonic acid is driven off and then reducing it to a fine powder. All Roman cement thus made contains a varying percentage of lime and hydraulic factors. The hydraulic factors mostly consist of hydrate of alumina, hydrate of silica, and peroxide of iron, the amount of the hydraulic factors depending upon the nature of the raw material used. When water is added to the Roman cement, these hydraulic factors combine with the lime and cause the cement to set. This setting, however, is very imperfect, as the combination of the lime with the hydraulic factors is very incomplete. According to the present invention powdered hydrate of calcium is added to the powdered Roman cement, so that the lime and the hydraulic factors contained in the mixture may, respectively, be in the proportion of seventeen to ten. The amount of the hydraulic factors in the Roman cement is first ascertained and the hydrate of calcium added, to bring the mixture up to the desired proportions. The mixture is then ready for use and will be found to possess the essential characteristics of Portland cement, although much cheaper to make, as true Portland cement requires a very high temperature and thorough calcination for its production.

What I claim is—

An artificial Portland cement consisting of a mixture of finely-pulverized Roman cement with a predetermined quantity of pure hydrate of calcium in the form of a fine dry powder, so that the lime and the hydraulic factors are substantially in the proportion of seventeen to ten.

In testimony whereof I affix my signature in presence of two witnesses.

CARL VON FORELL.

Witnesses:
LYMAN A. SPALDING,
WM. G. SPALDING.